F. H. OBERSCHMIDT.
MOTOR CONTROLLER.
APPLICATION FILED NOV. 6, 1920.
1,431,249.
Patented Oct. 10, 1922.
2 SHEETS—SHEET 2.
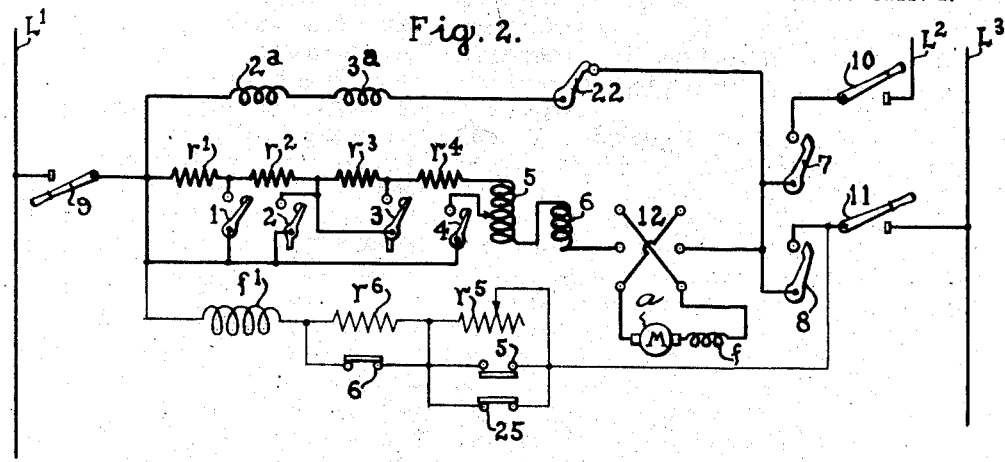
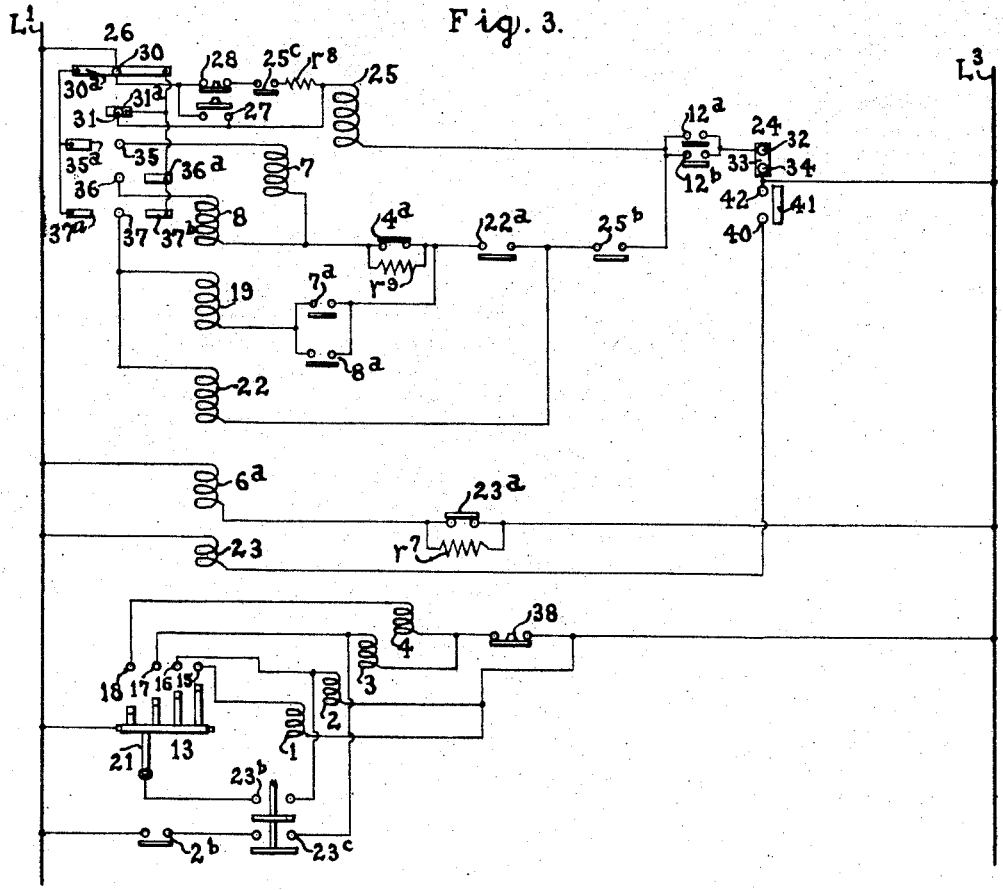
INVENTOR
Frederick H. Oberschmidt
BY
Frank H. Hibbard
ATTORNEY Patented Oct. 10, 1922.

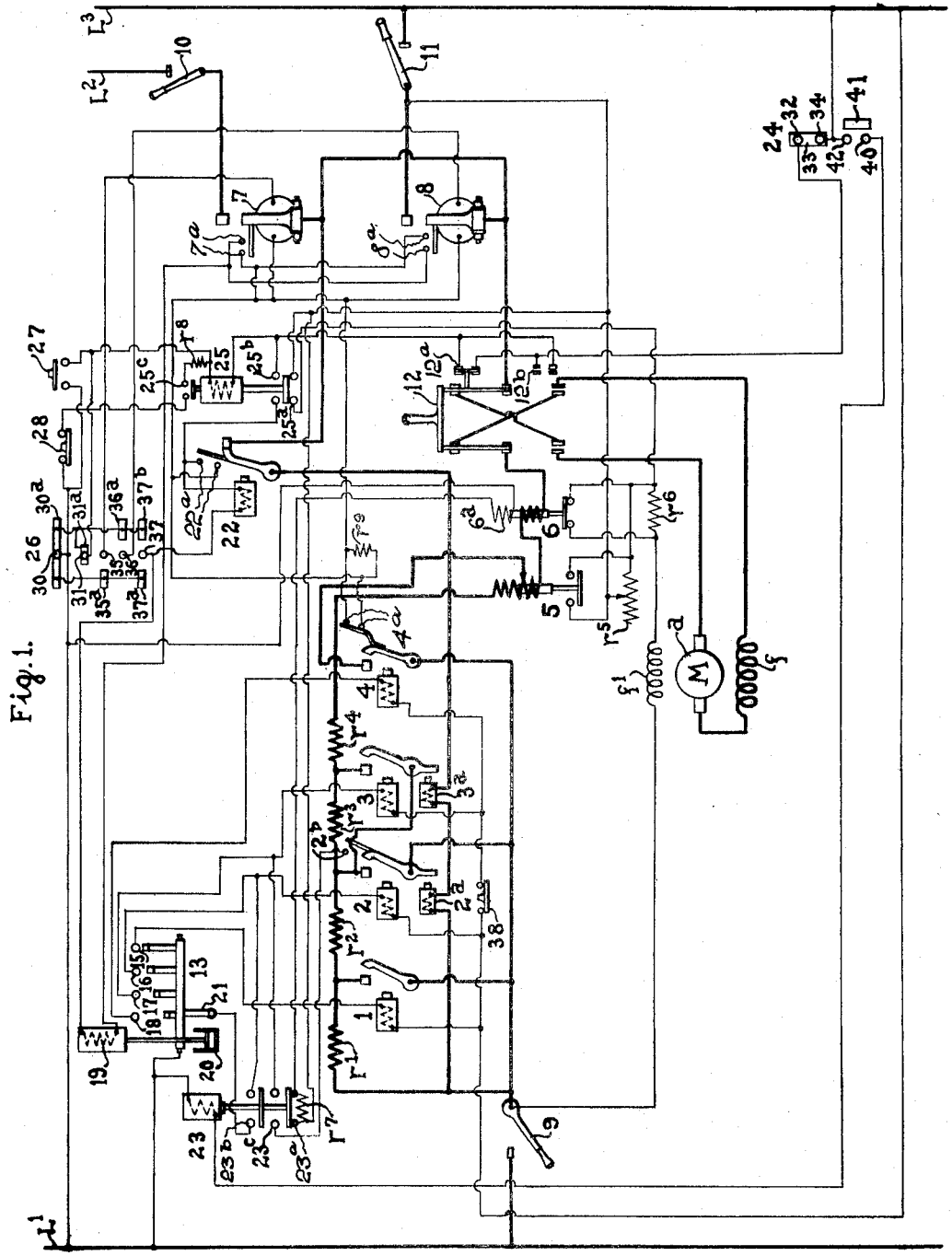

1,431,249

UNITED STATES PATENT OFFICE.

FREDERICK H. OBERSCHMIDT, OF CLEVELAND, OHIO, ASSIGNOR TO THE CUTLER-HAMMER MFG. CO., OF MILWAUKEE, WISCONSIN, A CORPORATION OF WISCONSIN.

MOTOR CONTROLLER.

Application filed November 6, 1920. Serial No. 422,154.

*To all whom it may concern:*

Be it known that I, FREDERICK H. OBERSCHMIDT, a citizen of the United States, residing at Cleveland, in the county of Cuyahoga and State of Ohio, have invented new and useful Improvements in Motor Controllers, of which the following is a full, clear, concise, and exact description, reference being had to the accompanying drawing, forming a part of this specification.

This invention relates to motor controllers and is particularly applicable to controllers for rubber calenders although not limited thereto.

An object of the invention is to provide a controller affording automatic resistance regulation for acceleration and dynamic braking, said controller being capable of entirely independent adjustments for varying the regulation afforded thereby for either acceleration or deceleration or both.

Another object is to provide a simple and efficient controller affording time limit acceleration of the controlled motor and graduated dynamic braking of said motor subject to control by the armature current.

Another object is to provide a controller having selectively operable stopping means each to effect dynamic braking of the controlled motor, certain of said stopping means effecting graduation of the dynamic braking current for a quick stop and other of said means effecting dynamic braking without regulation to afford a more gradual stop.

Another object is to provide a controller to function as aforestated, said controller utilizing the same resistance and the same resistance switches for control during both acceleration and dynamic braking.

Another object is to provide a controller to connect the controlled motor to either of a plurality of supply circuits, said controller having a single set of resistances and control switches therefor to be utilized for acceleration when the motor is supplied by either of said circuits and also to be utilized for dynamic braking control.

Another object is to provide a controller to connect the controlled motor to either of a plurality of supply circuits and to enable stopping of the motor by the same control switch regardless of the section of supply circuit therefor.

Various other objects and advantages of the invention will hereinafter appear.

The accompanying drawing diagrammatically illustrates one embodiment of the invention which will now be described, it being understood that the invention is susceptible of various modifications falling within the scope of the appended claims.

In the drawing,

Fig. 1 is a diagrammatic view of the controller in its entirety;

Fig. 2 is an across-the-line diagram of the motor circuits; and

Fig. 3 is an across-the-line diagram of the control circuits.

Referring to Fig. 1, the controller is employed to connect an electric motor M to different lines of a 3-wire supply circuit $L^1$, $L^2$ and $L^3$ to impress upon said motor different voltages. More specifically the controller is adapted to connect the motor M to lines $L^1$ and $L^2$ or to lines $L^1$ and $L^3$, the voltage across lines $L^1$ and $L^2$ being assumed to be less than the voltage across lines $L^1$ and $L^3$. The motor as illustrated comprises an armature $a$, an interpole field $f$ and a shunt field $f^1$, although it is of course to be understood that the controller is adapted to other types of motors supplied from either a single supply circuit or plurality of supply circuits selectively.

The controller comprises electro-responsive switches 1 to 4 inclusive respectively controlling armature resistances $r^1$ to $r^4$ inclusive, electro-responsive relays 5 and 6 respectively controlling field resistances $r^5$ and $r^6$, an electro-responsive main switch 7 for connecting the motor to lines $L^1$ and $L^2$, an electro-responsive main switch 8 for connecting the motor to lines $L^1$ and $L^3$, knife switches 9, 10 and 11 interposed between the motor and lines $L^1$, $L^2$ and $L^3$ respectively and a switch 12 for reversing the flow of current through the motor armature and interpole field. As will appear the controller also comprises various additional control switches including switches to effect response of switches 1 to 4 sequentially subject to time limit control for acceleration of the motor.

The switches 1 to 4 which are provided with shunt operating windings are normally open and are free to respond for acceleration immediately upon energization of their respective operating windings although switches 2 and 3 are respectively provided with lockout windings $2^a$ and $3^a$ for a purpose hereinafter set forth, said windings being normally disconnected from circuit. The operating windings of all of these switches are under the control of a switching device 13 having a plurality of sets of contacts 15 to 18 and a solenoid 19 for engaging said sets of contacts sequentially subject to retardation by a dash pot 20. The contacts 15 to 18 are engaged in the order mentioned to effect sequential response of switches 1 to 4 subject to time limit control afforded by the dash pot 20. The device 13 is also provided with normally engaged contacts 21 which are disengaged upon response of the solenoid 19, these contacts being provided for a purpose hereinafter set forth.

The lockout windings $2^a$ and $3^a$ of the resistance switches 2 and 3 are provided for inclusion in a dynamic braking circuit for the motor controlled by an electro-responsive switch 22. The switch 22 is normally closed and completes a dynamic braking circuit including the resistances $r^1$ to $r^4$ whereby if the operating windings of switches 2 and 3 are energized, said switches will respond subject to control by the dynamic braking current or more specifically subject to control by their lockout windings to graduate the dynamic braking action of the motor, said switches being interlocked as will hereinafter appear to insure sequential response thereof. In this connection it is to be understood that while the controller illustrated provides only for energization of switches 2 and 3 additional resistance switches might be provided with lockout coils and energized for further graduation of the dynamic braking current. Further it is to be understood that the dynamic braking circuit may be completed without effecting response of switches 2 and 3 and hence without graduation of the dynamic braking action.

The switches 2 and 3 are during dynamic braking under the control of an electro-responsive relay 23, energization of said switches being dependent upon prior response of said relay. This relay as will appear is independent of the normal stopping means and is dependent for energization upon operation of a special "safety" switch 24. The relay when energized in response to operation of the "safety" switch completes the energizing circuit of switch 2 through the down contacts of the switching device 13 and switch 2 upon response thereof completes the energizing circuit of switch 3 through the auxiliary contacts $2^b$ of the former switch whereby response of switches 2 and 3 is rendered sequential, the response of each switch being subject to delay by its respective lockout winding.

The relay 5, which is of the normally open type, is provided to exclude the field resistance $r^5$ during acceleration of the motor by switches 1 to 4 and to thereafter include said resistance in the shunt field circuit subject to control by the value of current in the motor circuit. To this end said relay is provided with a winding comprising two cumulative sections both connected in series with the motor armature. The cumulative action of these windings is such as to insure response of said relay immediately upon completion of the armature circuit whereas one of said windings is connected for exclusion by switch 4 upon responding to permit subsequent release of the relay under given current conditions. On the other hand the relay 6 is provided to control the resistance $r^6$ during deceleration, said relay being normally closed and having an operating winding in series with the motor armature and a shunt winding $6^a$ adapted to oppose the series winding during acceleration and to act cumulatively therewith during deceleration. This provides for rendering the relay inoperative during acceleration while rendering said relay operative during deceleration subject to control by the value of current in the dynamic braking circuit. As will be understood quick stopping of the motor is facilitated by a field strengthening and it is therefore preferred to render the relay 6 inoperative during dynamic braking under the control of switches 2 and 3 except when the motor current rises to a given value such that inclusion of resistance $r^6$ is desirable for protection of the motor. To this end the switch 23 is arranged to include a resistance $r^7$ in series with the shunt winding $6^a$ of relay 6 when the former relay responds to effect response of switches 2 and 3. This resistance is designed to so curtail the pull of the winding $6^a$ as to render the relay 6 unresponsive thereby short-circuiting the field resistance $r^6$. Also provision is made to insure short-circuiting of the field resistance $r^5$ during dynamic braking as will hereinafter appear.

An electro-responsive relay 25 is provided to energize main switches 7 and 8 subject to selective control by a master switch 26 and to also control the dynamic braking switch 22. Furthermore this relay and the master switch either directly or indirectly control the energization of the shunt windings of all remaining switches. The relay 25 when de-energized effects de-energization of switches 7, 8 and 22 thereby providing for interruption of power connections and establishment of dynamic braking connections and moreover through the medium of the down contacts $25^a$ thereof short-circuits the field resistance $r^5$. On the other hand when switch 25 responds, it completes circuit through its contacts $25^b$ to energize one or the other of switches 7 and 8 according to the setting of the master switch and to also energize the switch 22 to interrupt the dynamic braking circuit.

The relay 25 is under the control of the master switch 26, a normally open "start" push button switch 27 and a normally closed "stop" push button switch 28. The arrangement is such that the relay may be energized either by depression of the push button switch 27 or by movement of the master switch 26 to off position as shown. However, the relay functions to complete the above-described circuits only when the master switch is in one of its operative positions although said relay upon responding completes through its auxiliary contacts $25^c$ a maintaining circuit for its winding, said circuit extending through a protective resistance $r^8$ and "stop" switch 28. Thus if the relay is energized by the master switch when in off position it will remain energized during movement of the master switch to one of its alternative operative positions for selective energization of switches 7 and 8 as well as energization of switch 22. Likewise, if the "start" switch 27 is depressed when the master switch occupies one of its operative positions relay 25 will respond and remain energized upon release of switch 27. On the other hand whenever the master switch is in an operative position and the switch 27 is open the relay may be de-energized at will to interrupt power connections and to establish dynamic braking connections by depressing "stop" switch 28. Moreover, the safety switch 24 is included in circuit with the winding of relay 25 whereby said relay may be de-energized at any time by operation of said switch regardless of the position of the master switch and such operation of the safety switch 24 energizes the switch 23 to provide for graduation of the subsequent dynamic braking action of the motor.

The motor connections established by the controller are illustrated in simplified form in Fig. 2 and referring thereto, circuit may be traced from line $L^1$ through knife switch 9 and resistances $r^1$ to $r^4$ in series to and through the series coils of relays 5 and 6 to the reversing switch 12 which provides for supplying current to and through the motor armature and interpole field in either direction, the motor circuit extending from the reversing switch through switches 7 and 10 to line $L^2$ or alternatively through switches 8 and 11 to line $L^3$. Also circuit may be traced from line $L^1$ through the knife switch 9 to and through the shunt field winding $f^1$ of the motor and through resistances $r^6$ and $r^5$ to knife switch 11 and thence to line $L^3$, the resistance $r^5$ having a short circuit through contacts of switches 5 and 25 and resistance $r^6$ having a short circuit through contacts of relay 6. These connections provide for power operation of the motor whereas circuit may be traced from one terminal of the motor armature through the reversing switch and dynamic braking switch 22 to and through the windings $3^a$ and $2^a$ of resistance switches 3 and 2 respectively, thence through resistances $r^1$ to $r^4$ and the series windings of relays 5 and 6 to and through the reversing switch to the opposite terminal of the motor armature for dynamic braking. The switch 1 as will be apparent serves to short-circuit resistance $r^1$, the switch 2 serving to short-circuit resistances $r^1$ and $r^2$, the switch 3 serving to short-circuit resistance $r^3$ and the switch 4 serving to short-circuit all of the armature resistances together with one section of the winding of relay 5. Thus it will be apparent that sequential response of switches 1 to 4 provides for sequential exclusion of all armature resistances for acceleration when the motor is connected to either supply circuit while sequential response of switches 2 and 3 provides for exclusion of resistances $r^1$ and $r^2$ and thereafter exclusion of resistance $r^3$ for graduated dynamic braking, resistance $r^4$ being retained in circuit.

The control circuits are illustrated in simplified form in Fig. 3, and referring thereto, circuit may be traced from line $L^1$ to contact finger 30 and segment $30^a$ of the master switch 26 to segment $31^a$ and finger 31 of said switch when in off position and thence to the operating winding of relay 25. The return circuit of this winding extends through contacts 32, 33 and 34 of the safety switch 24 to line $L^3$, said return circuit furthermore extending through auxiliary contacts $12^a$ or $12^b$ of the reversing switch 12 which contacts, as shown in Fig. 1, are engaged selectively upon closure of the switch according to the direction of throw thereof. Alternatively, circuit may be traced from line $L^1$ through the "start" switch 27 to and through the operating winding of relay 25, the return circuit for said winding being the same as described. Furthermore, upon response of relay 25 circuit may be traced from line $L^1$ to and through the "stop" switch 28, the auxiliary contacts $25^c$ of said relay 25 and resistance $r^8$ to the relay winding for maintaining said winding energized subject to de-energization upon failure of voltage or depression of switch 28 or upon operation of the safety switch 24 to disengage contact 33 from contacts 32 and 34 or upon opening of reversing switch 12.

Further referring to Fig. 3 and assuming operation of the master switch to engage its segment $35^a$ with finger 35, circuit may be traced from line $L^1$ to and through said switch to the winding of main switch 7, the return circuit of said winding extending through auxiliary contacts 4ª provided on accelerating switch 4 as shown in Fig. 1. Contacts 4ª are engaged when switch 4 is open and are disengaged upon response of said switch to include in the return circuit of the winding of switch 7 an interlocking resistance $r^9$ which serves upon de-energization of switch 7 to insure against re-energization thereof until switch 4 is reopened to include in the motor circuit the starting resistance. Also the return circuit for the winding of switch 7 extends through auxiliary contacts 22ª provided on the dynamic braking switch 22 as shown in Fig. 1, said contacts being disengaged when switch 22 is closed to establish dynamic braking connections and being engaged when said switch is energized to interrupt said connections. Furthermore the return circuit of switch 7 extends through contacts 25ᵇ of relay 25, the auxiliary contacts of reversing switch 12 and the contacts 32 to 34 of the safety switch 24. On the other hand, assuming positioning of the master switch to engage segment 36ª with finger 36, circuit may be traced from line L¹ to and through said switch to the operating winding of main switch 8, the return circuit of this winding being the same as the return circuit of the winding of switch 7. Thus, both switches 7 and 8 are subject to de-energization by the return of the master controller to off position, by de-energization of the relay 25, by opening of the knife switch or by operation of the safe switch.

As also shown in Fig. 3 when the master switch occupies either of its operative positions circuit may be traced from line L¹ to segment 37ª and contact finger 37 or alternatively to segment 37ᵇ and finger 37 and thence to the solenoid winding 19 of the switching device 13, the return circuit of which includes parallel connected contacts 7ª and 8ª provided on the main switches 7 and 8 respectively as shown in Fig. 1. The contacts 7ª and 8ª are normally disengaged in open position of their respective switches whereby response of the solenoid 19 is dependent upon prior closure of one of the main switches and the return circuit of said solenoid is moreover subjected to control by the contacts 22ª, 25ᵇ, 12ª, 12ᵇ and contacts 32 to 34 of the safety switch.

Response of the solenoid 19 operates device 13 to sequentially connect the shunt windings of switches 1 to 4 directly across lines L¹ and L³ as shown in Fig. 3, these connections being obvious and the connections of the windings of switches 3 and 4 including in series therewith a normally closed push button switch 38, also shown in Fig. 1. Sequential establishment of these circuits obviously effects sequential response of the switches 1 to 4 subject to time limit control by the device 13 to accelerate the motor as described when connected to either supply circuit. Moreover, depression of switch 38 renders the switches 3 and 4 unresponsive to the device 13 pending release of said switch 38 whereby the resistances $r^3$ and $r^4$ may be maintained in circuit at will for slow speed operation of the motor as, for example, to provide a threading-in speed for a rubber calender.

Further referring to Fig. 3, it will be observed that upon operation of the controller as above described to start the motor, circuit may be traced from line L¹ through the master switch to its contact finger 37 and thence through the winding of the dynamic braking switch 22 to and through the contacts 25ᵇ, 12ª or 12ᵇ and contacts 32 to 34 of the safety switch 24, thus providing for energization of the switch 22 to interrupt dynamic braking connections. Also a circuit may be traced from line L¹ to and through the shunt winding 6ª of the field relay 6 to the return circuit of said coil including the normally engaged contacts 23ª of relay 23 which contacts upon disengaging insert resistance $r^7$ in circuit with said winding for the purpose above stated, namely to change the calibration of relay 6 during dynamic braking.

Assuming acceleration of the motor followed by operation of the safety switch, switches 25, 7, 8 and 22 together with the solenoid 19 of the device 13 are de-energized to interrupt power connections, to establish the dynamic braking circuit and to de-energize switches 1 to 4 to include resistances $r^1$ to $r^4$ in the dynamic braking circuit. At the same time circuit may be traced from line L¹ to and through the winding of relay 23, the return circuit of which extends through contacts 40, 41 and 42 of the safety switch 24 which are engaged by the above-mentioned operation of said safety switch. Relay 23 thereupon responds completing circuit from line L¹ to and through down contacts 21 of switching device 13 and thence to and through contacts 23ᵇ of switch 23 to the operating winding of resistance switch 2. Switch 2 is thereupon rendered responsive, subject to delay by its lockout winding, to exclude resistances $r^1$ and $r^2$ and upon responding circuit may be traced from line L¹ through the auxiliary contacts 2ᵇ of switch 2 and contacts 23ᶜ of switch 23 to the winding of resistance switch 3. Switch 3 is thereupon rendered responsive, subject to delay by its lockout winding, to exclude resistance $r^3$ for further graduation of the dynamic braking action of the motor. Upon de-energization of the relay 25 without operation of the safety switch the same dynamic braking connections are established but the switches 2 and 3 are rendered unresponsive owing to the fact that the relay 23 is not energized under such conditions. Accordingly the controller functions to effect more gradual stopping of the motor.

What I claim as new and desire to secure by Letters Patent is:

1. In a motor controller, in combination, a dynamic braking circuit including resistance, a switch for excluding a portion of said resistance subject to control by the current in said circuit and control means for said circuit and said switch providing for completion of the former subject to or free from control by the latter.

2. In a motor controller, in combination, a dynamic braking circuit including resistance, a switch for excluding a portion of said resistance subject to control by the current in said circuit and means to complete said dynamic braking circuit, including alternatively operable elements one to effect completion of said circuit subject to control by said switch and another to effect completion of said circuit free from control by said switch.

3. In a motor controller, in combination, a dynamic braking circuit, automatic means to effect graduation of the dynamic braking action and means for controlling the continuity of said dynamic braking circuit, said means including alternatively operable elements each acting to effect completion of said circuit and acting respectively to render said first-mentioned means effective and ineffective.

4. In a motor controller, in combination, power connections and dynamic braking connections, a resistance common to said connections, means for varying said resistance for acceleration and dynamic braking subject to current control during dynamic braking and means for completing the dynamic braking connections and for rendering said first-mentioned means effective or ineffective at will.

5. In a motor controller, in combination, means to establish power and dynamic braking connections for the controlled motor, a switch operable both for acceleration of the motor and control of the dynamic braking action thereof and independent means rendering the operations of said switch subject to delays influenced by the aforesaid commutations of the motor connections.

6. In a motor controller, in combination, means to establish power and dynamic braking connections for the controlled motor, means operable for effecting both acceleration of the motor and control of its dynamic braking action and means subjecting said former means to time limit control in its performance of one of such functions and to current limit control in its performance of the other of such functions.

7. In a motor controller, in combination, a resistance switch to control both motor acceleration and dynamic braking and means associated with said switch to definitely time the operation thereof for acceleration and to subject the same to control by the dynamic braking current to time the operation thereof for dynamic braking.

8. In a motor controller, the combination with a plurality of resistance switches to control both motor acceleration and dynamic braking, of means associated with said switches to effect progressive operation thereof subject to time limit control for acceleration and subject to current limit control for dynamic braking.

9. In a motor controller, the combination with a plurality of resistance switches to control both motor acceleration and dynamic braking, of means associated with said switches to effect progressive operation of all for acceleration and progressive operation of a lesser number thereof for dynamic braking, said means further subjecting said switches to time limit control for acceleration and to current limit control for dynamic braking.

10. In a motor controller, the combination with a plurality of resistance switches, of means to establish power connections and to effect progressive operation of said switches subject to time limit control for motor acceleration and means to establish dynamic braking connections and to effect operation of certain of said switches subject to control by the dynamic braking current for graduated dynamic braking action.

11. In a motor controller, in combination, a resistance switch having an operating winding and a lockout winding, means for establishing power connections for the motor and to energize the operating winding of said switch subject to time limit control for acceleration and means for establishing dynamic braking connections including the lockout winding of said switch and for further energizing the operating winding of said switch for operation thereof subject to current limit control.

12. In a motor controller, in combination, a plurality of electro-responsive resistance switches, certain of said switches having lockout windings in addition to their operating windings, means for establishing power connections and energizing said switches progressively subject to time limit control for acceleration and means for establishing dynamic braking connections including the lockout windings of said switches and for further establishing energizing circuits for the latter of said switches whereby they are again rendered responsive but subject to current control for graduation of the dynamic braking action of the motor.

13. In a motor controller, in combination, resistance controlling means, means for establishing power connections and for effecting operation of said resistance controlling means subject to time limit control for acceleration and means for establishing dynamic braking connections and for alternatively rendering said resistance controlling means again operative to control the dynamic braking action of the motor subject to current limit control or rendering said resistance controlling means ineffective during dynamic braking.

14. In a motor controller, in combination, resistance, means to establish power and dynamic braking connections including said resistance, said means including a normally closed dynamic braking switch and control means for said resistance under the control of the former means to operate subject to time limit control for acceleration and current limit control for dynamic braking.

15. In a motor controller, in combination, a resistance, control means for said resistance and means for alternatively establishing power and dynamic braking connections including said resistance, said means including a normally closed dynamic braking switch and controlling means rendering said resistance controlling means effective or ineffective at will for regulation of dynamic braking.

16. In a motor controller, in combination, means to connect the motor to either of a plurality of supply circuits for starting and a stopping switch operable to effect interruption of the power connections of the motor when connected to either supply circuit, said switch being biased to return to normal position but being inoperative to effect re-establishment of power connections.

17. In a motor controller, in combination, means to connect the motor to either of a plurality of supply circuits for starting, a stopping switch biased to a given position and operable to effect interruption of the power connections of the motor when connected to either supply circuit and means necessitating manual operation of an element of said first-mentioned means to effect re-establishment of power connections.

18. In a motor controller, in combination, means to connect the controlled motor to either of a plurality of supply circuits for starting, a switch biased to a given position and operable to effect interruption of the power connections of the motor when connected to either supply circuit, a switch biased to a given position and operable to effect re-establishment of power connections according to the setting of said first-mentioned means and means necessitating operation of said first-mentioned means or operation of said last-mentioned switch to effect re-establishment of power connections following interruption thereof by said stopping switch.

19. In a motor controller, in combination, separate electro-magnetic switches to connect the controlled motor to either of a plurality of supply circuits, a common master controller for said switches adapted to operate the same for connection of the controlled motor to either of said supply circuits for starting, a push button switch operable to de-energize all of said electro-magnetic switches to effect interruption of power connections, said push button switch being biased to return to normal position but being ineffective to energize either of said electro-magnetic switches regardless of the position of said master controller.

20. In a motor controller, the combination with means for establishing a dynamic braking circuit including resistance, said means including a plurality of switches operable alternatively to effect establishment of said connections, of control means for said resistance rendered effective and ineffective by selective operation of said switches, and field weakening means for the motor controlled by certain of said switches to insure an increased field strength of the motor when said resistance controlling means is rendered effective.

21. In a motor controller, in combination, means including a plurality of switches operable alternatively to effect establishment of dynamic braking connections including resistance, control means for said resistance rendered effective and ineffective according to the switch selection for establishment of dynamic braking connections and field control means including a relay the calibration of which is also determined by such switch selection.

22. In a motor controller, in combination, means including a plurality of switches operable alternatively to establish dynamic braking connections including resistance, control means for said resistance rendered effective and ineffective according to the selection of said switches for establishment of dynamic braking connections, field control means including a relay having cumulative coils, one connected in the dynamic braking circuit and the other a shunt coil and means whereby the potential impressed upon said shunt coil is varied according to the switch selection for establishment of dynamic braking connections.

23. In a motor controller, in combination, a plurality of electro-responsive accelerating switches, a time element device for establishing the energizing circuits of said switches progressively and a normally closed push button switch in circuit with certain of said accelerating switches to delay response thereof at will for temporary curtailment of the motor speed.

24. In a motor controller, in combination, a plurality of electro-responsive resistance switches, means for establishing power connections for the motor and energizing said switches progressively, said means including a time element device operable to complete the energizing circuits of said switches sequentially, and means for establishing dynamic braking connections and effecting response of certain of said resistance switches subject to control by the dynamic braking current and subject to control of certain of said switches by other of the same to insure progressive operation thereof.

25. In a motor controller, in combination, resistance controlling means operable to control acceleration and dynamic braking subject to current limit control during dynamic braking, means for establishing power connections and effecting operation of said means for acceleration and means including alternatively operable elements to effect establishment of dynamic braking connections and further including a relay independent of certain of said elements but responsive to other of the same to render optional the use of said resistance controlling means for dynamic braking.

26. In a motor controller, in combination, a plurality of electro-responsive resistance switches, means for establishing power connections for the motor and effecting energization of said switches progressively for acceleration and means for establishing dynamic braking connections and effecting operation of certain of said resistance switches subject to control by the dynamic braking current for graduated dynamic braking, said last-mentioned means including a relay to select the switches to be energized for dynamic braking.

27. In a motor controller, in combination, a plurality of electro-responsive resistance switches, means for establishing power connections for the motor and effecting energization of said switches progressively for acceleration and means for establishing dynamic braking connections and effecting operation of certain of said resistance switches subject to control by the dynamic braking current for graduated dynamic braking, said last-mentioned means including a relay to select the switches to be energized for dynamic braking and further including means to effect establishment of dynamic braking connections without energization of said relay and hence without response of any of said switches.

In witness whereof, I have hereunto subscribed my name.

FREDERICK H. OBERSCHMIDT.

Certificate of Correction.

It is hereby certified that in Letters Patent No. 1,431,249, granted October 10, 1922, upon the application of Frederick H. Oberschmidt, of Cleveland, Ohio, for an improvement in "Motor Controllers," an error appears in the printed specification requiring correction as follows: Page 1, line 52, for the word "section" read *selection;* and that the said Letters Patent should be read with this correction therein that the same may conform to the record of the case in the Patent Office.

Signed and sealed this 16th day of January, A. D., 1923.

[SEAL.]

KARL FENNING,

*Acting Commissioner of Patents.*